(No Model.)

N. S. WAX.
LAMP.

No. 263,633.                              Patented Aug. 29, 1882.

Witnesses
S. N. Piper
E. B. Pratt

Inventor
Newman S. Wax
by R. H. Eddy, att'y

UNITED STATES PATENT OFFICE.

NEWMAN S. WAX, OF BOSTON, MASS., ASSIGNOR, BY MESNE ASSIGNMENTS, TO HIMSELF AND SAMUEL GRYZMISH, OF SAME PLACE.

LAMP.

SPECIFICATION forming part of Letters Patent No. 263,633, dated August 29, 1882.

Application filed July 17, 1882. (No model.) Patented in Germany July 16, 1880, No. 12,548.

*To all whom it may concern:*

Be it known that I, NEWMAN S. WAX, of Boston, in the county of Suffolk and State of Massachusetts, have invented a new and useful Improvement in Lamps; and I do hereby declare the same to be described in the following specification, and represented in the accompanying drawings, of which—

Figure 1:
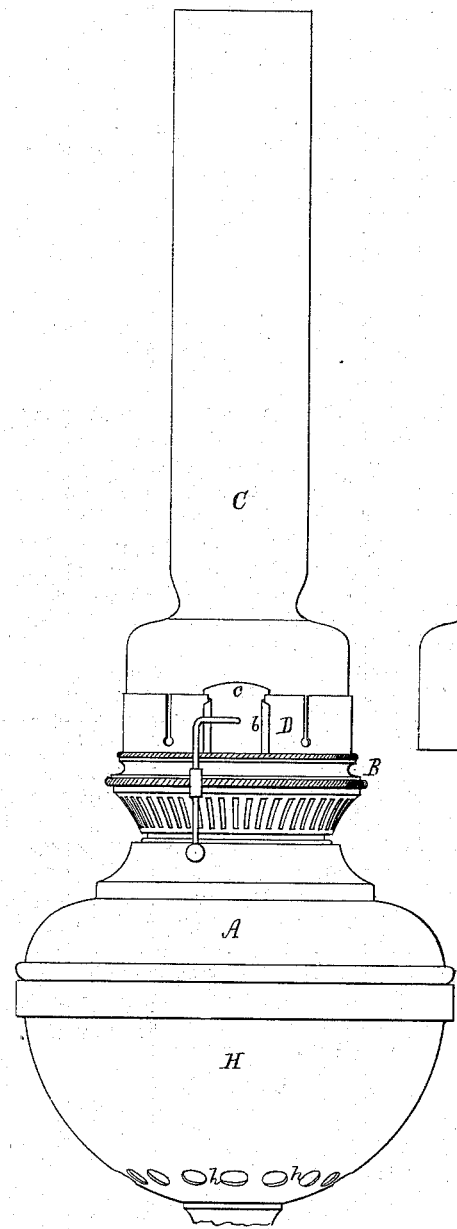
Figure 3:
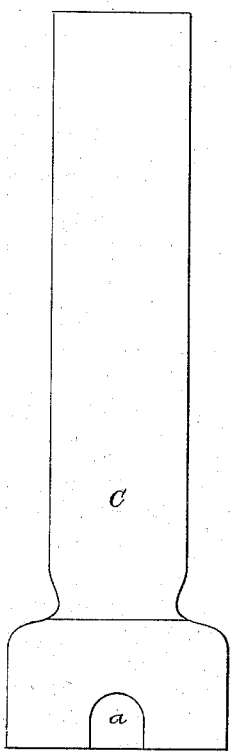
Figure 2:
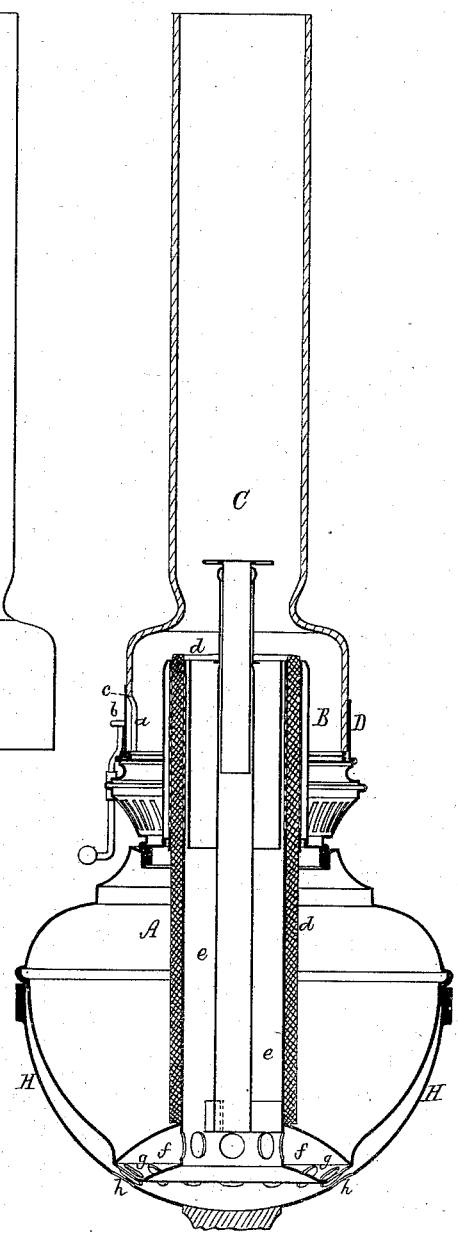

Figure 1 is a front elevation, and Fig. 2 a vertical section, of an Argand lamp provided with my invention, the nature of which is defined in the claims hereinafter presented. Fig. 3 is a side view of the lamp glass chimney, showing its lighting port.

In carrying out my invention I make or provide the glass chimney, at its lower part, with an opening or lighting port, it being shown at *a* and the chimney at C, and I make in the chimney-holder D a corresponding opening, *b*, or such and a door, *c*, or means of closing the said opening *b*, the same being so that when the chimney is in place in the holder these openings *a* and *b* may communicate or may be made to open into each other, so as to allow of a match being passed through them to the wick *d* to inflame such. By having the closing door or slide to the lighting part of the holder the necessity of revolving the chimney in the holder in order to close the port of the chimney by means of the holder is avoided.

The oil-reservoir A of the lamp is represented in the drawings as provided with an Argand burner, B, whose wick-tube *e* opens near its lower end into an annular chamber, *f*, surrounding it, and formed in the body of the reservoir, and furnished with a series of lateral openings, *g*, such being to supply air to the wick-tube when the reservoir may be resting on a flat surface, and also when placed within a supporting cup or bowl, H, formed and arranged with the reservoir, and provided with openings *h* disposed in it, the said bowl, in manner as represented. The air for supplying the outer surface of the flame passes through the lower part of and into the chimney-supporter, and thence up within the chimney.

What I claim as my invention is as follows, viz:

1. The glass chimney provided with the lighting-port, in combination with the chimney-holder having a corresponding lighting-port, all being arranged substantially as set forth.

2. The glass chimney provided with the lighting-port, in combination with the chimney-holder having a corresponding lighting-port and a closing door or slide therefor, all being substantially as set forth.

NEWMAN S. WAX.

Witnesses:
R. H. EDDY,
E. B. PRATT.